May 13, 1958  T. W. PRATT  2,834,715
PREPARATION OF CATALYTIC CRACKING FEED
Filed June 3, 1954
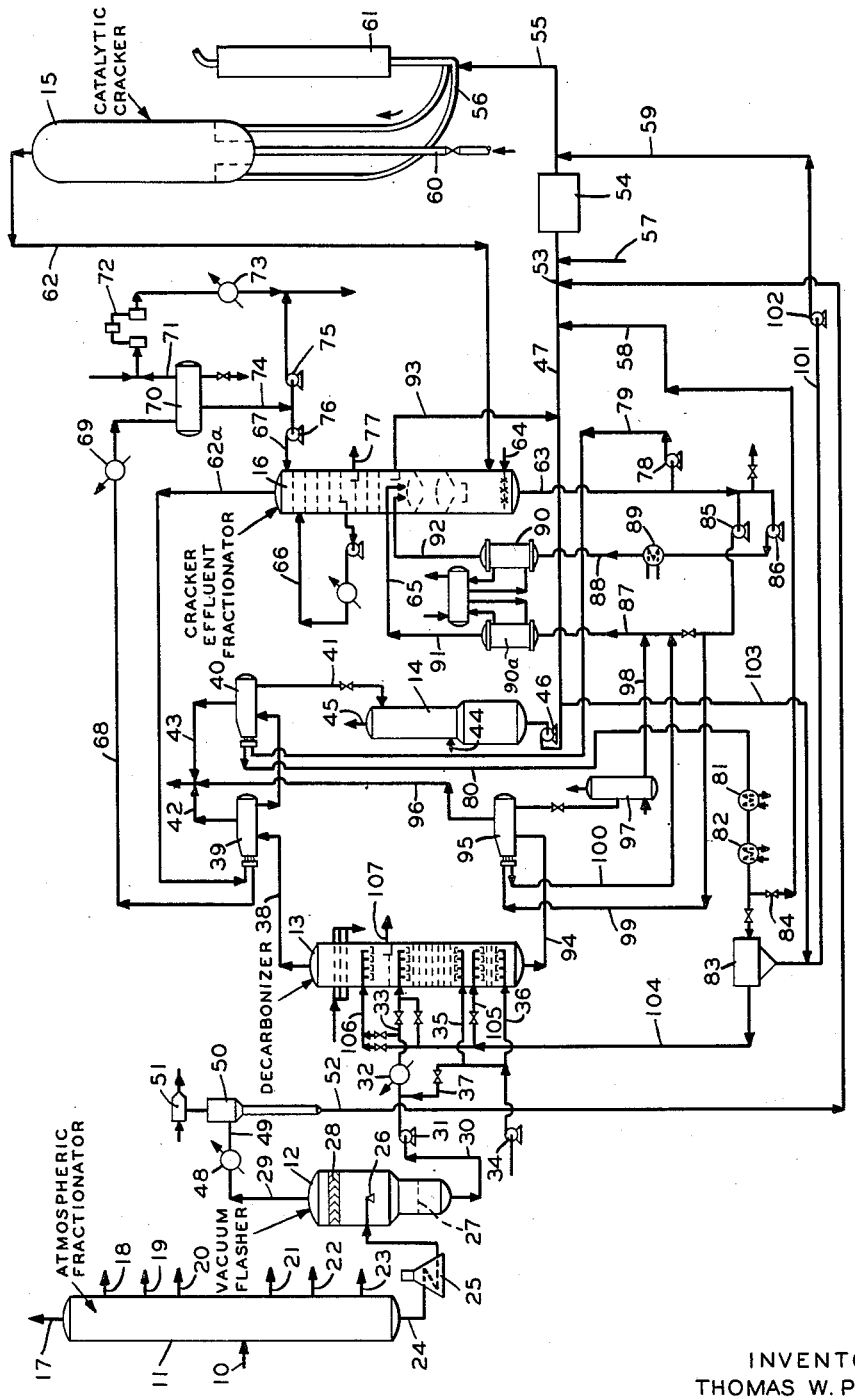
INVENTOR
THOMAS W. PRATT
BY D. N. Palmer
Edmond F. Shanahan
ATTORNEYS

United States Patent Office 2,834,715
Patented May 13, 1958

2,834,715
PREPARATION OF CATALYTIC CRACKING FEED

Thomas W. Pratt, Rutherford, N. J.

Application June 3, 1954, Serial No. 434,182

7 Claims. (Cl. 196—14.46)

This invention relates generally to the preparation of a catalytic cracking feed from topped petroleum crude. The process begins with the usual initial distillation of crude petroleum under pressures which are only slightly above atmospheric pressure; the residuum, or topped crude, usually comprises about 50% of the total virgin crude but may be as much as 90% or as little as 25% of the total virgin crude. The principal object of the novel process of the invention is to separate from said topped crude a large fraction of oil suitable for charging to a catalytic cracking reactor, i. e., a fraction which does not exceed a maximum of allowable tendencies to contaminate the catalyst with metals or to coke it, and which produces a satisfactory gasoline product.

More particularly, this invention relates to a process in which a topped crude is reduced to a short residuum by vacuum flashing a substantial part of the distillable components, solvent decarbonizing the vacuum bottoms to recover a maximum cut low in coke-forming components, such as condensed cyclic compounds, combining the decarbonized oil with at least part of the vacuum vapors to produce a catalytic feed stock comprising a larger percentage of the original crude than has heretofore been possible, and producing gasoline products of superior characteristics.

A critical feature of the invention is deliberate control of the complementary vacuum flash and solvent decarbonizing processes to limit contamination of the catalyst to a predetermined maximum. Another critical feature of the process is the removal of a sufficient portion of light components during vacuum flashing so that solvent decarbonization can more effectively separate desired catalytic feed components from undesired coke-forming components during the solvent decarbonizing. Furthermore, it is a feature that this separation during solvent decarbonization can be made effective with a lower solvent:oil ratio than would be suitable in the presence of the light components present in the topped crude prior to vacuum distillation. In order to operate the decarbonizing unit at as low a solvent ratio as possible, it is desirable that the vacuum flashing should cut as deeply into the crude as possible, subject to the limitation of decomposing heavy sulphur compounds, etc.

In decarbonizing, the objective is to extract by the action of the solvent as much oil as possible without any of the asphaltic components. Propane itself is highly selective for dissolving the more paraffinic and more saturated hydrocarbons, while rejecting the highly cyclic, hydrogen poor, probably oxygenated asphaltic components. These rejected materials are the components which form large amounts of carbon when cracked in the catalytic cracking unit. Furthermore, the complex asphaltic components always contain more or less metals in the form of metallo-organic structures, some of which have been determined to be porphyrins, or something similar. All of these materials, while relatively insoluble in propane are highly soluble in heavy distillates such as that which it is proposed to distill in the vacuum flash section. It is therefore beneficial to remove these distillates before decarbonizing because their presence in the extract phase solution increases the solubility of asphalt therein, and decreases the ability of the solvent to distinguish between oils and asphalts.

If the decarbonizing process alone were used, it would be possible to retain selectivity in the presence of large amounts of oil by increasing the propane:oil ratio thus bringing down the concentration; however, when the short residua are charged to decarbonizing, this "dilution" is not required and lower propane ratios are effective.

Although the invention relates generally to solvent decarbonization with normally gaseous hydrocarbons, the preferred solvents are propane or butane or mixtures thereof.

The accompanying drawing is a flow sheet of the significant parts of a catalytic cracking refinery embodying the invention. Petroleum crude enters the system at 10 and it, or fractions of it, flow through process equipment identified by accompanying numerals in the following sequence:

11, atmospheric fractionator
12, vacuum flasher
13, decarbonizer
14, decarbonized oil stripper
15, catalytic cracker
16, cracker effluent fractionator The crude which enters the atmospheric fractionator 11 at 10 may be fractionated into any of the usual refinery fractions, for example, gas comprised of butane and lighter hydrocarbons, 17; light naphtha, 18; heavy naphtha, 19; kerosene, 20; diesel or furnace oil, 21; light gas oil, 22; heavy gas oil, 23; and topped crude, 24. The fraction with which we are concerned here is topped crude 24, comprising between 25% and 90%, but usually about 50%, of the original crude. While gas oil fractions 21, 22 and 23 may be used to supplement the catalytic cracking feed derived from topped crude 24, the latter is ordinarily the source of 60% to 100% of the catalytic cracking feed.

While crudes, and therefore, topped crudes, vary considerably in composition and impurities from one oil field to another, it may be stated generally that topped crude is a heavy fraction comprised of components boiling at 650° F. or higher, the useful part of which are those molecules which can be satisfactorily reduced by catalytic cracking to lower boiling point materials suitable for motor fuels; in addition, the topped crude 24 contains asphalt, resins, and other condensed cyclics which would resist cracking or would form excessive quantities of coke and metallo-organic compounds of dehydrogenating metals, e. g., nickel, vanadium, iron, copper, etc., which would contaminate and degrade the catalyst. It is the major object of this invention to separate from topped crude 24 a maximum amount of material which can meet the usual industrial standards for catalytic cracking.

Topped crude 24 leaves atmospheric fractionator 11 at a temperature of about 650° F. and is heated in furnace 25 sufficiently to produce vaporization at a reduced pressure in vacuum flash tower 12. The topped crude 24 is heated in the furnace 25 to a sufficiently high temperature to produce and maintain a flash temperature in the tower 12 within the range of about 200° F. below that temperature at which substantial thermal decomposition of the topped crude begins to take place.

Vacuum flash tower 12 is an extremely simple piece of apparatus in comparison with the vacuum flash towers ordinarily used in petroleum refining. Since the hot reduced crude is to be separated only into one liquid and one vapor fraction, and since even this fractionation need not be precise, precise separation being left to subsequent solvent fractionation of the vacuum bottoms, it is not necessary to have bubble trays, reflux, side-stream draw-offs, steam strippers, or extended tower height. The hot oil discharges into the almost empty interior of flash tower 12 through a spray 26. Liquid collects in the bottom as indicated at 27. Vapors pass through a bed of suitable entrainment baffles 28, leaving the upper end of vacuum flash tower 12 through line 29 at a temperature of between 620° F. and 710° F., i. e., at the highest temperature which can be achieved without excessive thermal decomposition of oil suitable for catalytic conversion into gasoline. This temperature will depend upon crude properties which vary from crude to crude, so that some crudes will tolerate 20° F. or 30° F. higher vapor temperatures than others, given a certain maximum thermal decomposition to be tolerated. However, the preferred maximum temperature for any practical degree of thermal decomposition for any crude will fall within the narrow range specified.

The temperature of the unevaporated oil 27 accumulated in the lower end of vacuum flash tower 12 will ordinarily be 20° F. to 50° F. hotter than the vapor temperature; and the oil may experience temperatures slightly above 710° F. as a result of heating in furnace 25, but this higher temperature should be transitory only. The vapors leaving by way of line 29 ought to be maintained at a substantially constant predetermined temperature selected from within the described range.

The topped crude is separated by the relatively simple vacuum distillation in vacuum flash tower 12 into vapor and about 30% to 70% vacuum bottoms. The conditions of the vacuum flash distillation are so controlled however, that the vacuum bottoms removed from the flash tower 12 contain at least about 25% of the oil suitable for catalytic cracking originally present in the topped crude. The vacuum distillate removed from the tower 12 will represent from about 25% to 75% of the oil suitable for catalytic cracking originally present in the topped crude supplied to the vacuum flash tower 12. The pressure under which the vacuum distillation is carried out will fall within a range of about 50 to 200 millimeters of mercury absolute pressure although pressures somewhat higher but less than 300 millimeters of mercury, absolute pressure may be employed.

The vacuum bottoms leave vacuum flash tower 12 by way of line 30 and are destined for decarbonization tower 13, but must first be pumped to several hundred pounds per square inch pressure by pump 31, cooled from temperatures of nearly 700° F. to a temperature suitable for solvent fractionation, ordinarily about 200° F. or lower, by water cooler 32, and introduced into tower 13 by line 33.

Solvent, preferably about 70% propane and 30% butane, is pumped from solvent storage (not shown) by pump 34, into tower 13 by way of lines 35 and 36. Preferably about one-half a volume of solvent per volume of vacuum bottoms is mixed with the vacuum bottoms by means of line 37. It will be understood that other light hydrocarbons or other low-boiling solvents might be employed.

The remainder of the solvent, preferably another three volumes per volume of vacuum bottoms, enters the lower part of tower 13 at a temperature within the paracritical range of the solvent or solvent combination employed, with the hydrocarbon solvents referred to, the solvent is supplied at a temperature within about 100° F. of the critical temperature of the solvent. The vacuum bottoms charged to tower 13 is substantially heavier than that ordinarily charged to decarbonization, and it can be satisfactorily fractionated with the propane-butane mixture with a lower solvent:oil ratio than would be required were the entire topped crude charged to decarbonization. The solvent:oil ratio may vary from as low as 2:1 to as high as 8:1. If the entire topped crude were charged to decarbonization, its lighter components would tend to carry overhead some of the asphalt, resins, and other impurities, particularly metallo-organic compounds, which it is desired to eliminate from the catalytic cracking by way of the decarbonization raffinate. The precision of this process is achieved in the solvent decarbonization step. Propane selectively dissolves low molecular weight components, but it also selectively dissolves paraffinic, and saturated molecules in preference to cyclic and unsaturated molecules. The decarbonization process is capable of taking overhead paraffinic materials of somewhat higher molecular weight and boiling points than the unsaturated cyclics, which are rejected into the raffinate bottoms. Since metallo-organic components are generally complex cyclics, this means that the metal content of the catalytic cracking feed can be kept low when vacuum distillation and solvent decarbonizing are integrated.

The vacuum distillation need only remove from the oil the bulk of the light fractions; however, considerable tolerance may be allowed on the side of leaving some distillable oil in the vacuum bottoms. It is in decarbonizing tower 13 that the vacuum bottoms are carefully stripped of all the oil suitable for cracking, while at the same time, undesirable components, e. g., condensed cyclics, etc., are left in the asphaltic raffinate. However, the preliminary vacuum distillation step, simple though it is, makes it possible to carry out suitable decarbonization with a much lower solvent:oil ratio than would otherwise be possible. Removal by vacuum distillation of the bulk of highly soluble light oil makes easier a nice discrimination in the solvent fractionation. When the light oil is present, the higher solvent ratio is necessary because the light oil tends to carry overhead components not wanted in the extract of decarbonized oil. Also, the total volume of oil to be charged to solvent decarbonizing is greatly reduced.

The extract phase from decarbonizing tower 13, consisting of a solvent solution of decarbonized oil, leaves the upper end of tower 13 by way of line 38, and passes through evaporators 39 and 40 and then by way of line 41 to steam stripper 14.

Evaporators 39 and 40, preferably operated at pressures of about 250 pounds p. s. i. g. (storage pressure), may be heated by steam in the usual way, or, of desired, by a hot stream derived from another part of the process as shown in the drawing and to described hereinafter; temperatures are usually about 210° F. for 39 and about 400° F. for 40. In larger installations, a furnace may be substituted for the evaporators 39 and 40. Solvent vapor leaves evaporators 39 and 40 by way of lines 42 and 43, and is condensed and retured to storage by means not shown.

Residual solvent is stripped from the decarbonized oil in stripper 14 by steam introduced at 44 and exhausted at 45, and the decarbonized oil is pumped by pump 46 through line 47. Distillate from vacuum flash tower 12 is mostly condensed in condenser system 48, passed by line 49 to drop-out drum 50, upon which a vacuum is maintained by ejector 51, and from the bottom of which liquefied distillate is withdrawn through line 52 to be combined with decarbonized oil in line 47 at 53. It will be understood that in some refineries part of the liquefied vacuum distillate may be diverted for other purposes, but ordinarily most of it will find its way to catalytic cracking.

The mixture of vacuum distillate and decarbonized fraction passes through a catalytic cracker feed storage tank 54, line 55, and regenerated catalyst transfer line 56 into catalytic cracker 15. The mixture may be supplemented by other feed stocks, such as gas oils 21, 22 and 23, at 57. Also, slurry may be introduced into the mixture through lines 58 or 59 as described hereinafter.

Catalytic cracker 15 is indicated only schematically. Auxiliary steam (or air) is introduced through line 60. Spent catalyst is withdrawn and cycled to a regeneration system not shown, and returned by way of regenerated catalyst standpipe 61 to regenerated catalyst transfer lines 56.

The cracked hydrocarbons, now containing substantial percentages of lower boiling components suitable for motor fuels, pass from catalytic cracker 15 to the bottom of cracker effluent fractionator 16 by way of line 62 and is fractionated in said fractionator principally into a gasoline product, withdrawn overhead through line 62a and a heavy cycle oil containing catalyst particles, withdrawn through bottom line 63. During fractionation the bottom temperature of fractionator 16 is maintained by the introduction of superheated steam at 64; and the vapors rising within the fractionator encounter scrubbing liquids introduced at 65 and reflux introduced at 66 and 67.

The hot gasoline product vapor withdrawn through line 62 may be used to evaporate solvent from the decarbonized oil extract phase in evaporator 39 and then passed by way of line 68 through a condenser 69 to knock-out drum 70. Vapors passing overhead from drum 70 by way of line 71 may be compressed by compressor 72, condensed in condenser 73, and mixed with previously condensed gasoline withdrawn from drum 70 by line 74 and pump 75. Condensate from drum 70 may also be diverted to reflux line 67 by pump 76.

The sidestream 77 may be withdrawn from cracker effluent fractionator 16 for use as absorber oil or as feed to thermal cracking.

The heavy cycle oil withdrawn from the bottom of fractionator 16 by way of line 63 is ordinarily subjected to cooling and settling, and then recycled to cracking. This may be done in a great variety of ways within the scope of the present invention, but the particular embodiment shown employs the optional features of diverting some of the cycle oil by pump 78 through line 79 to evaporator 40, for service therein as a heating fluid, and then by way of line 80, through heat exchangers 81 and 82 to slurry settler 83, or recycled through valve 84 to line 58 for addition to the catalytic cracker feed flowing in line 47.

Another optional feature is that cycle oil in line 63 may be diverted by pumps 85 and 86 through lines 87 and 88 (the latter being provided with a heat exchanger 89 to extract heat) through water coolers 90a and 90, and then by way of lines 91 and 92 to an intermediate point of fractionator 16 wherein it serves as scrubbing medium for removing catalyst and some of the heavy fractions from the upflowing vapors.

A sidestream is withdrawn from fractionator 16 by way of line 93 just above the point of introduction of the oil recirculated to catalytic cracking via line 47, thus increasing the cracking yield. Sidestream 93 is relatively free of catalyst because of its high point of withdrawal, and therefore, requires no slurry settling.

The asphaltic raffinate phase from decarbonizer 13 is withdrawn from the bottom thereof through line 94; solvent is evaporated therefrom in evaporator 95, the solvent vapor going overhead through line 96 and the asphaltic raffinate being steam stripped in steam stripper 97 and returned through line 98 to cycle oil moving through line 87. It will be understood, of course, that this is only one form of the invention and that this asphaltic raffinate could be withdrawn from the process at this stage, or subjected to thermal cracking or other processing to obtain additional catalytic cracker feed. Some of the hot cycle oil may be used instead of steam in evaporator 95, if desired, for evaporating solvent from the asphaltic raffinate; lines 99 and 100 are shown to indicate this possible use.

The catalyst slurry from slurry settler 83 is passed by way of line 101 and pump 102 into line 59 to mix with the catalytic cracker feed flowing to catalytic cracker 15 by way of line 55. The slurry may be made more flowable by the addition of some of the decarbonized oil diverted from line 47 through line 103 to slurry line 101. The remaining cycle oil withdrawn from slurry settler 83 through line 104 may be introduced into decarbonizer 13 at two or more points, lines 105 ad 106, in order to strip from the cycle oil and light components suitable for cracking; however, this is an optional feature.

The problem with which this process comes to grips is one of producing from atmospheric reduced crude as much catalytic cracking feed as possible, given a maximum allowable tendency to deposit carbon on the catalyst. In the catalytic cracking process cycle, it is necessary to burn off all the deposited coke in the regeneration step. Every catalytic cracking unit has a built-in coke burning capacity, which cannot be exceeded. If the coke producing tendencies of the catalytic cracking feed are high, then the quantity of feed passed through cracking must be relatively low, other factors remaining constant. In the exceptional case of a natural crude free of metal contaminants, the aim of the operator is to produce a feed having as low a coke producing tendency as possible so that he can pass the largest quantity of feed through catalytic cracking for the coke burning capacity of his regenerator. The present process is useful with such a crude and its usefulness is indicated approximately by testing and comparing feeds prepared from the atmospheric reduced crude, by vacuum distillation alone, by propane decarbonizing alone, or by the complementary combination of the two as described in this process. The test employed is the American Society for Testing Materials Conradson carbon residue test, ASTM D189–52. This test indicates approximately the coke producing tendencies of a given oil fraction, except that solvent decarbonized oil, apparently because of the removal of condensed cyclic compounds, produces much less coke on catalyst than oils of the same Conradson carbon residue, which have not been solvent decarbonized. Thus as taught by this invention, it becomes important to keep the Conradson carbon residue value of that portion of the catalytic cracking feed produced, that is not subjected to solvent treatment, as low as is practicable. A Conradson carbon residue value of less than 0.5% by weight is preferred. In processing a metal-free crude the atmospheric reduced crude is vacuum flashed, and a preferred range to determine the depth of the vacuum cut is by the properties of the vacuum residuum. Two alternatives present themselves:

(a) Vacuum flashing my be sufficiently deep so as to leave a vacuum residuum having a Conradson carbon residue between 10% and 20% or (b) Vacuum flashing may be sufficiently deep to leave a vacuum residuum having an SUS viscosity at 210° F. between 1500 and 5000 seconds. (SUS refers to the American Society for Testing Materials test for viscosity.)

It will be understood that within the aforementioned preferred range, it is further preferred to carry the vacuum cut to as high a carbon residue or viscosity vacuum residuum as possible without substantial thermal decomposition and without raising the Conradson carbon residue value to or above 0.5%.

The vacuum residuum, preferably having properties within one of the ranges specified, is decarbonized with a normally gaseous hydrocarbon solvent, preferably propane or butane, and particularly a mixture of propane and butane containing between 5% and 50% butane. The solvent:oil ratio will ordinarily be between 3 and 6, the lower ratios naturally being preferred for the sake of economics; however, higher solvent:oil ratios within this range are required for lower viscosity vacuum residuum feed stocks. In the decarbonizing step, one seeks to separate from the vacuum residuum as large an extract of crackable oil as he can without exceeding some Conradson carbon residue figure, which will be determined by the capacity of his regenerator for burning coke. Many economic and operating factors will determine the Conradson carbon residue weight-percent residue which the operator will specify for his catalytic cracking feed; these residues may range from as low as 1% to as high as 6% or 7%. Whatever the operator may specify in this regard, the Conradson carbon residue of the extract phase may be higher, but preferably not above 10% as long as it is mixed with vacuum distillate or other low Conradson carbon residue oil stocks in sufficient quantity to bring down the Conradson carbon residue of the mixture to the required number.

Metal-free crudes are comparatively rare. Most crudes, particularly those available cheaply from newly discovered fields in South America and the Middle East, present the additional problem of contamination with dehydrogenating metal compounds, usually compounds of vanadium, nickel, iron, or copper, which eventually turn up as a contaminating deposit on the catalyst in the form of oxides $V_2O_5$, $NiO_2$, $Fe_2O_3$, or $CuO$, unless eliminated from catalytic cracking feed. Not all of these oxides are equally harmful as catalyst contaminants; the iron, vanadium, and copper oxides are usually found to be about ½ to ⅛ as harmful as nickel oxide. In any event, the presence of these contaminants can be expressed in terms of parts per million of the oxides present, and the accuracy of this figure is somewhat increased by expressing it in terms of parts per million of nickel equivalent, other oxides being added in after being multiplied by some fractional constant which expresses in terms of the amount of unequal oxide which would have had the same effect. In terms of nickel equivalent, catalytic cracking feed in most commercial catalytic crackers may have as little as one-half a part per million, or if the refinery is capable of accepting highly contaminated feed, as much as ten parts per million.

Unlike the carbon deposited on the catalyst, the metal contaminants, once deposited on the catalyst, remain there, and are not burned off by regeneration. They simply accumulate. When a catalytic cracking system is first put on stream with new catalyst, the carbon laid down on the catalyst in the catalytic cracking zone is that which would be expected from the carbon residue of the oil; however, as operation continues, the metal contaminants steadily accumulating on the catalyst have the extremely undesirable property of encouraging carbon formation. If this were to continue, the rate of coke formation would in a few days exceed the rate at which the regenerator could burn the coke. Of course, the operator could begin to steadily decrease the feed rate, but this would not be economically sound, and furthermore, the accumulation would continue at a reduced rate, and he would eventually be forced to shut down. The only way to prevent accumulation is to remove catalyst, and replace with fresh catalyst at a rate which maintains an equilibrium with the accumulation of deposited metal oxides. It will be seen thus, in a 20,000 barrel per stream day catalytic cracking system with two or three parts per million of metal contaminants that it may be necessary to replace three to five tons of catalyst per day in order to get rid of a few pounds of metal. The rate at which the operator must replace catalyst is about arithmetically proportional to the parts per million of metal contaminants in the feed stock, and he is therefore anxious to reduce metal contamination in the feed to a minimum, thereby maximizing his quantity of through-put for a given daily catalyst replacement rate. Some daily loss of catalyst from the regenerator stack is unavoidable; the refinery operator would prefer to reduce the metal contaminants in his feed bed to a point such that the replacement rate required for metal contaminants will balance the unavoidable flue gas catalyst loss. It is the major object of the present invention to provide a process for preparing from the reduced crude a maxmimum quantity of catalytic cracking feed having no more metal contaminants and coke forming tendencies than can be tolerated by the available cracking facilities and an economic catalyst replacement rate.

In the following numerical examples, crudes, identified by their origin, were processed according to the above described novel process and the results compared with customary processes such as decarbonizing or vacuum treating alone.

EXAMPLE I

Type of crude: Illinois Pipeline
Data: Table I 100 volumes of crude atmospheric fractionated to produce 14.8 volumes of atmospheric reduced crude, 13.4° API, 13.9° weight percent Conradson carbon residue, 1720 seconds SUS viscosity at 210° F. The Conradson carbon residue indicated the presence of metal contaminants, such as oxides of nickel, vanadium, iron and copper, substantially in excess of that desirable for catalytic cracking. A part of the 14.8 volumes were then vacuum flashed to take 3.5 volumes (24.7% of the oil flashed) overhead, reducing the residum to 11.3 volumes on crude, and still further increasing its density, carbon residue, and viscosity as follows: 11.4° API, 17.6 Conradson carbon residue, and 4,000 seconds SUS viscosity at 210° F.

Two samples from the original 14.8 volumes of atmospheric reduced crude (runs No. 1 and No. 2), and two samples of the vacuum residuum (runs No. 3 and No. 4), were then fractionated by the propane decarbonizing process in order to extract catalytic cracking feed. Of course, the quantity of vacuum residuum which had to be propane decarbonized was smaller than the corresponding quantity of reduced crude prior to vacuum distillation, so that runs No. 3 and No. 4 produced only 5.1 and 6.1 volumes of extract as compared with 9 volumes and 8 volumes respectively for runs No. 1 and No. 2. However, the cracking feed recovered from the atmospheric reduced crude by combining vacuum distillate with propane decarbonizing extract amounted to 8.6 and 9.6 volumes respectively. The properties of the decarbonized oil showed that the vacuum residuum extracts had a slightly higher Conradson carbon residue than the extracts of atmospheric reduced crude. However, the properties of the total oil for cracking, decarbonized extract in the case of runs No. 1 and No. 2, and decarbonized extract plus vacuum distillate in the case of runs No. 3 and No. 4 showed that the combination produced more catalytic cracking feed of better quality than the propane decarbonizing alone. Correlation of the data showed that the estimated Conradson carbon residue for 9 volumes of total oil was only 1.75 for the combination as against 2.3 for decarbonizing alone; or the estimated oil yield for a maximum allowable Conradson carbon residue of 2.3 weight percent was only 9 volumes of the original crude for decarbonizing alone, but 11 volumes for the combination.

Since propane decarbonizing alone is well known to be superior to vacuum distillation alone, both as to quality of feed for a given cut, and as to quantity of feed for a given quality (excepting only very small quantities), it is reasonable to expect that the margin of superiority of the combination with respect to the vacuum flashing alone would be even greater.

In addition to producing more oil of lower carbon residue, the combination process has the additional and previously unexpected advantage that it can be manipulated to eliminate most of the metal contaminants. The better Conradson carbon residue figure for the combination of the two processes does not reveal all of the advantages of the combination product. This only appears when one tests the metal content and discovers that the combination process produces catalytic cracking feed which has a much lower metal content than other feeds for a given Conradson carbon residue figure. When the Illinois Pipeline crude was processed, the atmospheric residuum had over ten parts per million of metal contaminants; but after treatment by the combination process, there was less than one part per million.

Table I

|  | Atmospheric Reduced Crude 14.8 | Vacuum Residuum 11.3 |
|---|---|---|
| Charge to Decarbonizing, Percent on crude: | | |
| °API | 13.4 | 11.4 |
| Conradson C. R., wt. percent | 13.9 | 17.6 |
| Vis., SUS, C, 210° F | 1,720 | 4,000 |

|  | Decarbonizing of Atmos. Residuum | | Decarbonizing of Vacuum Residuum | |
|---|---|---|---|---|
|  | Run #1 | Run #2 | Run #3 | Run #4 |
| Oil Yield from Decarb., Percent | | | | |
| Crude | 9.0 | 8.0 | 5.1 | 6.1 |
| Vacuum Distillate | | | 3.5 | 3.5 |
| Total Oil recovered | 9.0 | 8.0 | 8.6 | 9.6 |
| Prop. Dec. Oil: | | | | |
| Gravity, API | 21.6 | 22.6 | 22.5 | 21.1 |
| C. C. R | 2.3 | 1.6 | 1.7 | 2.9 |
| Prop. Total Oil for Cracking C. C. R | 2.3 | 1.6 | 1.0 | 1.9 |

|  | | |
|---|---|---|
| Est. C. C. R. for 9.0 total oil | 2.3 | 1.75 |
| Est. Oil Yield for 2.3% C. C. R | 9.0 | 11.0 |

EXAMPLE II

Type of crude: Rangely
Data: Table II

Table II compares propane decarbonization of atmospheric residuum, in the first column, with a combination of vacuum flashing and propane treatment of the vacuum residuum only, in the second column. In decarbonizing vacuum residuum, three different samples were taken and three runs of increasing depth of cut were made. The last two lines of the table show favorable comparison of the combination process either on the basis of yield or of conradson carbon residue. In addition, the parts per million in nickel equivalent of metal contaminants were so reduced (less than one part per million) that there was substantially less carbon formation for the combination process at the same yield and the same Conradson carbon residue than for catalytic cracking feed taken directly from atmospheric reduction, or prepared by vacuum distillation or solvent decarbonizing only.

Table II

|  | Atmospheric Residuum 51% | Vacuum Residuum 15% | | |
|---|---|---|---|---|
| Resid., Percent of Crude: | | | | |
| °API | 22.9 | 13.3 | | |
| C. C. R | 5.1 | 16.3 | | |
| Viscosity | 55.6 | 791 | | |
|  | | Run #1 | Run #2 | Run #3 |
| Percent Oil Yield from Decarb | 94.4 | 37.4 | 43.4 | 58.3 |
| Percent on Crude | 48.0 | 5.6 | 6.5 | 8.75 |
| Vacuum Distillate | | 36 | 36 | 36 |
| Total Oil | 48.0 | 41.6 | 42.5 | 44.75 |
| Properties of Decarbonized Oil: | | | | |
| Gravity | 24.8 | 25.3 | 25.1 | 23.6 |
| C. C. R | 1.9 | 1.2 | 1.8 | 2.4 |
| Viscosity | 50 | 103 | | 131 |
| Properties of Total Oil C. C. R | 1.9 | 0.23 | 0.31 | 0.61 |
| Comparison at Same Yield 48.0% | 1.9 | | 1.7 | |
| Comparison at Same C. C. R. 1.7% | 47.2 | | 48.0 | |

EXAMPLE III

Type of crude: West Texas
Data: Table III

A 39.6% atmospheric reduced crude was processed for catalytic cracking by vacuum distillation only, with results shown in the first column of Table III. The nickel equivalent in parts per million was only .62, which is quite satisfactory, but note that the yield was only 29.5% of the crude. If larger recovery had been attempted by taking a deeper vacuum cut, the nickel equivalent would have been substantially higher, and thermal decomposition would have become an increasingly adverse factor. When, however, the 39.6% atmospheric residuum was flashed only 50%, down to 19.8% vacuum residuum, the latter being propane decarbonized, the combination of 19.8% vacuum distillate and the propane extract produced a total catalytic cracking feed of 32.5% in run #1 (column 2 in Table III), or 33.5% of crude in run #2 (column 3 of Table III). Note that the milder vacuum distillation has the advantage of producing less thermal decomposition than the deep vacuum distillation of column 1. The yield of catalytic cracking feed was of higher quality than that obtained by deep vacuum distillation alone, and yield was increased by over 10%.

Table III

COMPARISON OF CATALYTIC CRACKER CHARGE STOCKS PRODUCED BY VACUUM DISTILLATION AND PROPANE DECARBONIZING

|  | Vacuum Distillation of 39.6% Atmospheric Residuum | Vacuum Distillation to 19.8% Vac. Resid. followed by Prop. Decarb. | |
|---|---|---|---|
|  |  | Run #1 | Run #2 |
| Yield, Vol. Percent on crude | 29.5 | 32.5 | 33.5 |
| Carbon Residue, Wt. Percent: | 0.86 | 0.80 | 1.13 |
| $V_2O_5$, p. p. m | 0.45 | 0.10 | 0.26 |
| NiO, p. p. m | 0.33 | 0.18 | 0.28 |
| $Fe_2O_3$, p. p. m | 0.45 | 0.29 | 0.53 |
| $SiO_2$, p. p. m | 1.81 | 0.23 | 0.57 |
| Nickel Equivalent, p. p. m, NiO | 0.62 | 0.35 | 0.59 |
| Total Ash, p. p. m | 15.4 | 2.24 | 4.25 |

EXAMPLE IV

Type of crude: Kuwait
Data: Table IV

In Table IV it was desired to crack as much as possible of the bottom 50% of the crude. Three cases are set forth, vacuum flashing only in column 1, decarbonization only in column 2, and the combination in column 3. In the example actually used, the bottom 49.8 parts by volume of crude was available for catalytic cracking feed, the top 50.2% being allocated to other products, gasoline, kerosene, diesel and furnace oils, etc. In each of the three cases, 17.5% was taken as a sidestream from the atmospheric topping unit; this stream is itemized as atmospheric distillate in Table IV. The remaining 32.3% was vacuum flashed in column 1 as deeply as it was possible to go without exceeding the allowable metal contamination and Conradson carbon residue figures, resulting in 30.7 volumes total catalytic cracking feed out of 49.8 volumes available. In column 2, using decarbonization alone, it was necessary to use a relatively high solvent:oil ratio in order to extract 15.2 volumes from the atmospheric residuum, resulting in a total catalytic cracking feed of 32.7 volumes. When, however, the 32.3 volumes of atmospheric residuum were first vacuum distilled to separate 10.1 volumes of vacuum distillate (see middle of column 3, Table IV), and the remaining 22.2 volumes of vacuum bottoms were then decarbonized, an additional 7.8 volumes of decarbonized extract were recovered, making a total of 35.4 volumes of catalytic cracking feed obtained by combination. Note, also, that only 2.9 solvent:oil ratio was required, making this a cheaper operation than when decarbonization alone was employed.

It happens that the combination process produces a product with a slightly higher metal content, but all three metal content figures are so low that the differences are not significant. Actually, correlation of the data revealed that if the metals content of the decarbonization process only (column 2, Table IV) had been increased to .81, the Conradson carbon residue would have increased to 1.5, whereas the yield would have increased only to 33.5. It would have been impossible to have increased yield from the vacuum flashing alone without encountering substantial thermal decomposition of the stock. Vacuum flashing followed by decarbonizing gave 4.7% more oil than vacuum flashing alone, and 2.7% more than direct decarbonization, and at 2.9 volumes of solvent per volume of 22.2% atmospheric residuum. Thus, the combination produced more oil with a decarbonizing system having 68.5% of the oil capacity and only 40% of the solvent circulation capacity of the direct decarbonizing system. It is doubtful if the 32.3% atmospheric residuum could have been decarbonized at all with a solvent:oil ratio of 2.9, let alone with the excellent selectivity on the 22.2% atmospheric residuum.

In the preferred form of the process it is not necessary to risk the thermal decomposition involved in deep vacuum flashing; it is not necessary to exceed a flashing temperature of 700° F., nor to take a deeper cut than 60% of the charge to vacuum flashing. Relatively light vacuum flashing removes the very components which require higher solvent:oil ratios in decarbonizing, so that the vacuum residuum may be cut somewhat deeper during solvent decarbonizing, but with a smaller solvent:oil ratio. Preferably, the depth of the cut during decarbonization should take as much oil as can be obtained without exceeding one part per million of nickel equivalent metal contamination.

It will be understood, of course, that this process might be combined with additional processing of the decarbonized oil, or of the catalytic cracking feed, prior to catalytic cracking. The process of this invention applies to any expanded process in which the major parts of the decarbonized oil eventually form a part of the catalytic cracking feed.

*Table IV*

|  | Vacuum Flashing Only | Decarbonization Only | Combination |
| --- | --- | --- | --- |
| Resid. Length to Decarb. |  | 32.3 | 22.2 |
| Decarb. s:o ratio |  | 5.0 | 2.9 |
| Products: |  |  |  |
| Atm Distillate (directly to cat. cracking) | 17.5 | 17.5 | 17.5 |
| Vacuum Distillate | 13.2 | 0 | 10.1 |
| Decarb. Oil | 0 | 15.2 | 7.8 |
| Total Cat. Cracker Feed | 30.7 | 32.7 | 35.4 |
| CCF Metals Ni and Va, p. p. m. | 0.69 | 0.48 | 0.81 |
| Conradson Carb. Res., Wt. Percent | 0.96 | 1.1 | 1.2 |

I claim:

1. A method for preparing a charge oil for catalytic cracking, which includes the steps of: heating an atmospheric reduced crude and introducing it into a vacuum flash tower at a temperature sufficiently high to maintain a flash temperature within the range of about 200° F. below that at which substantial thermal decomposition begins to take place; withdrawing a vacuum distillate from said tower; withdrawing from said tower a vacuum bottoms comprised of at least 25% of the oil present in said reduced crude and suitable for catalytic cracking; cooling said vacuum bottoms, introducing said cooled vacuum bottoms into a fractionation zone and countercurrently contacting said cooled vacuum bottoms therein with normally gaseous hydrocarbon solvent at temperatures within 100° F. of the critical temperature of said solvent to fractionate said vacuum bottoms into an asphaltic raffinate and a decarbonized oil extract having a Conradson carbon residue substantially lower than said vacuum bottoms; and employing the major parts of said vacuum distillate and said decarbonized oil in forming a catalytic cracking feed.

2. A method for preparing a charge oil for catalytic cracking, which includes the steps of: heating an atmospheric reduced crude and introducing it into a vacuum flash tower at a temperature sufficiently high to maintain a flash temperature within the range of about 200° F. below that at which substantial thermal decomposition begins to take place; withdrawing a vacuum distillate from said tower; withdrawing from said tower a vacuum bottoms comprised of at least 25% of the oil present in said atmospheric reduced crude and suitable for catalytic cracking; cooling said vacuum bottoms, introducing said vacuum bottoms into a fractionation zone and countercurrently contacting said vacuum bottoms therein with a normally gaseous hydrocarbon solvent at temperatures within 100° F. of the critical temperature of said solvent to fractionate said vacuum bottoms into an asphaltic raffinate and a decarbonized oil extract having a Conradson carbon residue of less than half that of said vacuum bottoms; and combining said decarbonized oil extract with at least the major part of said vacuum distillate to form a catalytic cracking feed.

3. A method for preparing a charge oil for catalytic cracking which includes the steps of: heating an atmospheric reduced crude and flashing it under a pressure of less than 300 millimeters of mercury absolute pressure to produce a vacuum distillate comprising between 25% and 75% of the oil suitable for catalytic cracking in said atmospheric residuum; cooling the bottoms resulting from the flashing of said atmospheric residuum and countercurrently contacting it with between 2 and 8 parts of normally gaseous hydrocarbon solvent at paracritical temperatures, recovering from said solvent contacting step a decarbonized oil extract having a Conradson carbon residue of less than half that of said bottoms; and forming a catalytic cracking feed employing at least the major parts of said vacuum distillate and said decarbonized oil.

4. A method as described in claim 3 in which the vacuum distillation is controlled to restrict the vacuum distillate produced thereby to a portion having a Conradson carbon residue of less than .5 weight percent.

5. The method as described in claim 3 in which said solvent contacting step is controlled to restrict the decarbonized oil extract produced thereby to a portion having a Conradson carbon residue of less than 10.

6. The method as described in claim 3 in which said solvent contacting step is controlled to restrict the decarbonized oil extract produced thereby to a portion having not more then ten parts per million by weight of nickel, iron, vanadium and copper.

7. A method for preparing a charge oil for catalytic cracking which includes the steps of: heating an atmospheric reduced crude and flashing it under a pressure of less than 300 millimeters of mercury absolute pressure to produce a vacuum distillate comprising between 25% and 75% of the oil suitable for catalytic cracking in said atmospheric residuum and having a Conradson carbon residue of less than 0.5 weight percent; cooling the bottoms resulting from the flashing of said atmospheric residuum and countercurrently contacting it at paracritical temperatures with between 2 and 8 parts of a solvent comprised primarily of a mixture of propane and butane; recovering from said solvent contacting step a decarbonized oil extract having a Conradson carbon residue of less than half that of said bottoms; and forming a catalytic cracking feed employing at least the major parts of said vacuum distillate and said decarbonized oil.

References Cited in the file of this patent

UNITED STATES PATENTS

| | | |
|---|---|---|
| 2,528,586 | Ford | Nov. 7, 1950 |
| 2,616,912 | Dickinson | Nov. 4, 1952 |
| 2,685,561 | Whiteley et al. | Aug. 3, 1954 |

Notice of Adverse Decision in Interference

In Interference No. 90,231 involving Patent No. 2,834,715, T. W. Pratt, Preparation of catalytic cracking feed, final judgment adverse to the patentee was rendered May 11, 1962, as to claims 1 and 2.

[*Official Gazette June 26, 1962.*]